United States Patent Office 3,402,192
Patented Sept. 17, 1968

3,402,192
POLYOXYALKYLENE SILOXANE
BRANCH COPOLYMERS
Loren A. Haluska, Midland, Mich., assignor to Dow Corning Corporation, Midland, Mich., a corporation of Michigan
No Drawing. Continuation-in-part of application Ser. No. 430,205, Feb. 3, 1965. This application July 16, 1965, Ser. No. 472,720
18 Claims. (Cl. 260—448.2)

ABSTRACT OF THE DISCLOSURE

Polyoxyalkylene siloxane branch copolymers useful in the preparation of polyurethane foams are disclosed. The copolymers of this invention allow greater processing latitude than was possible heretofore. Polyurethane foams prepared with these copolymers do not exhibit the undesirable pneumatic effect.

---

This application is a continuation-in-part of application Ser. No. 430,205, filed Feb. 3, 1965 which application was a division of application Ser. No. 127,843, filed July 31, 1961, both the aforesaid applications now being abandoned.

This invention relates to block copolymers of polysiloxanes and polyalkylene oxides in which the blocks of polymer are tied together through silicon carbon bonds.

It is known that certain copolymers of alkylene oxides and polysiloxanes in which the siloxane blocks and the alkylene oxide blocks are tied together through SiOC linkages are useful as surfactants in the control of polyurethane foams. It is also known that certain linear copolymers of alkylene oxides and polysiloxanes in which the polymer blocks are tied together through silicon carbon bonds are useful as surfactants in the control of polyurethane foams. The latter materials have a distinct advantage over the former since they are nonhydrolyzable and hence are stable to deterioration by water or other materials containing reactive hydroxyls. This means that the latter type of surfactant can be stored under moist conditions or stored admixed with the polyethers prior to foaming.

However, the polyoxyalkylene polysiloxane copolymers which are tied together through silicon carbon bonds which have heretofore been known, suffered from the disadvantage that the one shot flexible foams formed employing them as surfactants exhibited a so-called pneumatic effect. That is when the foam was compressed and the pressure released the foam did not immediately return to its original shape. This is very disadvantageous when the foam is to be used as a cushion. Although the pneumatic effect can be eliminated by mechanically crushing the foam so as to rupture the closed cells, this operation represents an added step in the production of polyurethane foams and hence is undesirable from a cost standpoint.

It is the primary object of this invention to provide novel copolymers which are useful as surfactants and as emulsifying agents. Another object is to provide a stable nonhydrolyzable surfactant for polyurethane foams which does not give a pneumatic effect in the foam. A further object is to provide superior surfactants for the production of polyurethane foams which exhibit excellent solubility in water and excellent stability in mixtures with polyglycols, amines and fluorocarbons. A still further object is to provide surfactants for the production of polyurethane foams which allow greater processing latitude in that they permit broader formula deviations, wider catalyst tolerances and they help to produce a good foam over a wider physical range of manufacturing conditions. Other objects and advantages will be apparent from the following description.

This invention relates to copolymers having the average structural formulae of the group (1) $R_aSi[(OSiMe_2)_n(OSiMeG)_dOSiMe_2G]_{4-a}$,
(2) $GMe_2Si(OSiMe_2)_n(OSiMeG)_bOSiMe_2G$,
(3) $Me_3Si(OSiMe_2)_n(OSiMeG)_cOSiMe_3$ and
(4) $R_aSi[(OSiMe_2)_n(OSiMeG)_cOSiMe_3]_{4-a}$ in which formula R is a hydrocarbon radical free of aliphatic unsaturation and contains from 1 to 10 carbon atoms,
Me is a methyl radical,
G is a radical of the structure $-D(OR'')_mA$ wherein
  D is an alkylene radical,
  R'' is composed of ethylene radicals and radicals selected from the group consisting of propylene and butylene radicals, the amount of ethylene radicals relative to the other alkylene radicals being such that the ratio of carbon atoms to oxygen atoms in the total OR'' blocks ranges from 2.3:1 to 2.8:1,
  m has an average value from 25 to 100,
  A is a radical selected from the group consisting of the —OR', —OOCR' and

radicals wherein R' is a radical free of aliphatic unsaturation selected from the group consisting of hydrocarbon and hydrocarbonoxy radicals, the A radical containing a total of less than eleven atoms,
a has an average value of from 0 to 1,
n has an average value of from 6 to 420,
d has an average value of from 0 to 30,
b has an average value from 1 to 30 and
c has an average value from 3 to 30, said copolymers containing at least 13 percent by weight $OSiMe_2$ units based on the weight of the copolymer.

It should be understood that the above formulae represent the "average molecular configuration" for the products of this invention. In other words, the lengths of the dimethylsiloxy blocks and/or the oxyalkylene blocks in the copolymers are not all the same and can vary considerably provided the average value is such that $n$ and $m$ fall within the specified ranges. Furthermore, the silicon atoms to which the oxyalkylene blocks are attached need not be evenly spaced along the main siloxane chain.

The products of this invention are best made by reacting the omega alkenyl ether, preferably the allyl ether, of the desired polyalkylene glycol with the corresponding siloxane containing SiH groups. This reaction is best carried out by heating a mixture of the two reactants in the presence of a platinum catalyst such as platinum dispersed on an inert carrier or a compound of platinum such as chloroplatinic acid, at temperatures from 100 to 200° C. The siloxane reactants can be of four configurations; namely, (1) $R_aSi[(OSiMe_2)_n(OSiMeH)_d(OSiMe_2H)]_{4-a}$ (2) 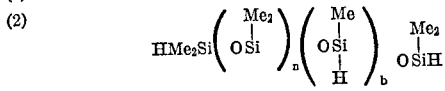

(3) 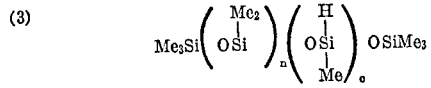

and (4) $R_aSi[(OSiMe_2)_n(OSiMeH)_cOSiMe_3]_{4-a}$

Configuration (1) is best prepared by cohydrolyzing a silane of the formula $R_aSiX_{4-a}$ with dimethyldichlorosilane, methyldichlorosilane, and dimethylmonochlorosilane and thereafter equilibrating the cohydrolyzate with an acid catalyst such as $H_2SO_4$. The silanes are employed in the proportion of one mol of $R_aSiX_{4-a}$, $n$ mols dimethyldichlorosilane, $d$ mols of methyldichlorosilane and at least $4-a$ mols of dimethylmonochlorosilane. Configuration (2) is best prepared by cohydrolyzing the silanes in proportion of $n$ mols of dimethyldichlorosilane, two mols of dimethylmonochlorosilane, and $b$ mols of methyldichlorosilane. The hydrolyzate can then be equilibrated with $H_2SO_4$. Configuration (3) is best prepared by cohydrolyzing the silanes in the proportion of $n$ mols of dimethyldichlorosilane, two mols of trimethylmonochlorosilane, and $c$ mols of methyldichlorosilane and thereafter equilibrating the cohydrolyzate as above. Configuration (4) is best prepared by cohydrolyzing one mol of a silane of the formula $R_aSiX_{4-a}$ with $n$ mols of dimethyldichlorosilane, $c$ mols of methyldichlorosilane and at least $4-a$ mols of trimethylchlorosilane and thereafter equilibrating the cohydrolyzate as above.

For the purpose of this invention, R can be any hydrocarbon radical free of aliphatic unsaturation of from 1 to 10 carbon atoms such as methyl, ethyl, hexyl, phenyl, tolyl, benzyl, xylyl, methylcyclohexyl, cyclohexyl, cyclopentyl, β-phenylpropyl, β-phenylethyl, decyl and isopropyl.

The omega alkenylpolyglycol ethers employed in this invention can be copolymers of ethylene oxide and propylene oxide or copolymers of ethylene oxide and butylene oxide or copolymers of all three oxides. In any event, the proportions of the various alkylene groups should be such that the carbon to oxygen ratio in the alkyleneglycol ether should be from 2.3:1 to 2.8:1, preferably from 2.45:1 to 2.55:1. The other ends of the polyalkyleneglycol ether should consist of the group A.

For the purpose of this invention, A can be any radical of the formulae —OR', —OOCR' or

in which R' can be any hydrocarbon radical free of aliphatic unsaturation such as methyl, ethyl, butyl, isopropyl, cyclohexyl, phenyl, tolyl, benzyl or xenyl or any hydrocarbonoxy radical such as —OCH(CH$_2$OMe)$_2$. In these radicals the total number of C and O atoms if any should not exceed 10, that is, the A radical should contain a total of less than eleven atoms.

Thus it can be seen that the polyoxyalkylene blocks of the copolymers of this invention can be blocked with ether, acyl or carbonate ester groups. These groups are best formed by capping the polyalkyleneglycolmonoomegaalkenyl ether after it is formed by any conventional procedure. Thus, for example, one may react the alkali metal salt of the monoallyl ether with an alkyl chloride to produce an OR' group or one may react the monoallyl ether with an acyl halide or acid anhydride to produce an OOCR' group or with an alkylchloroformate to produce the

group. All of these reactions are carried out by well-known procedures.

The omega alkenyl end of the omega alkenylpolyglycol ethers can be linear or branched in configuration and can contain any number of carbon atoms. Upon addition of these ethers to the SiH compound, the alkenyl radical becomes an alkylene radical which is represented in the formulae above by the symbol "D." Specific examples of D are the methylene, ethylene, propylene, isopropylene, butylene, octylene, decylene, octadecylene and the myricylene radicals. Preferably D contains from 1 to 18 carbon atoms with the propylene radical derived from the allyl ether being the most preferred at this time.

The copolymers of this invention are useful in controlling the foam formulation in polyurethane resins. The copolymers are operative with any type of polyurethane polymers such as those based upon polyesters and those based upon polyethers. The use of the copolymers in such foams is described in detail in application Ser. No. 127,843, referred to above, the disclosure of which is incorporated herein by reference.

The following examples are illustrative only and should not be construed as limiting the invention which is properly delineated in the appended claims. In the examples and claims Me is employed as an abbreviation for the methyl radical. All viscosities and refractive indexes (RI) were measured at 25° C. unless otherwise specified.

EXAMPLE 1

130.8 g. of

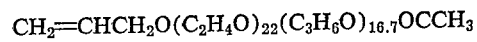

was mixed with 204 g. of xylene, 43.2 g. of

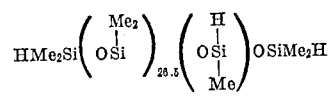

and 2 g. of 1 percent platinum dispersed on alumina and heated at 141° C. for 24 hours. The product was stripped to a temperature of 200° C. at 1.2 mm. to give a fluid water soluble material having the following properties:

RI—1.4460; viscosity—1,368 cs. The material had the average general formula

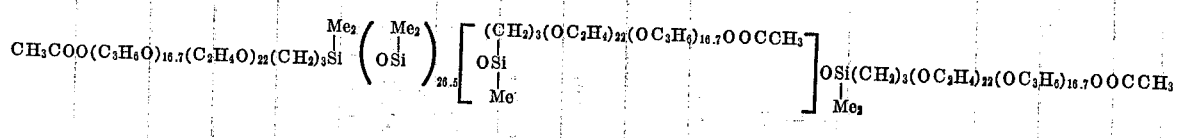

EXAMPLE 2

A mixture of 163.7 g. of $$CH_2=CHCH_2O(C_2H_4O)_{27.5}(C_3H_6O)_{20.9}OCCH_3$$

54.9 g. of

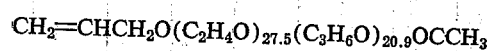

125 g. of toluene and .2 g. of 1 percent by weight platinum as chloroplatinic acid in dimethylphthalate, was heated at 122° C. for 24 hours. The product was then stripped to remove solvent and the residue had a viscosity of 2,655 cs. and a refractive index of 1.4450. This product had the average formula

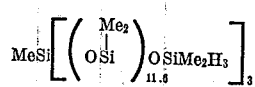

EXAMPLE 3

Employing the procedure of Example 2, 130.8 g. of $$CH_2=CHCH_2(OC_2H_4)_{35.4}(OC_4H_8)_{14.4}OOCCH_3$$

was reacted with 42.6 g. of

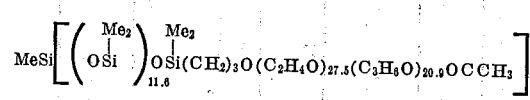

in 124 g. of xylene at 146.2° C.

The resulting product was a fluid having a viscosity of 4,405 cs. and a refractive index of 1.4490. The product had the average formula

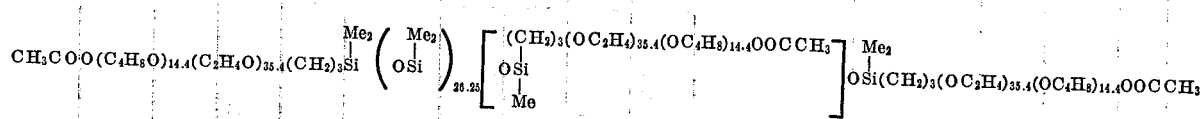

EXAMPLE 4

Employing the procedure of Example 2, 168.5 g. of $CH_2=CHCH_2(OC_2H_4)_{28.1}(OC_4H_8)_{9.24}OOCCH_3$ was reacted with 53.8 g. of

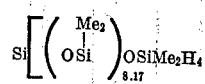

in 252.3 g. of xylene at 144° C. The resulting product had a viscosity of 1,950 cs. and a refractive index of 1.4480. The product had the average formula

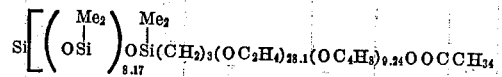

EXAMPLE 5

Employing the procedure of Example 2, 120.3 g. of $CH_2=CHCH_2(OC_2H_4)_{22.5}(OC_3H_6)_{17.1}OOCCH_3$ was reacted with 45.5 g. of

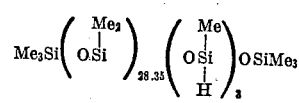

in 195.8 g. of xylene. The resulting product had a viscosity of 2,175 cs. and a refractive index of 1.4425. The product had the average general formula of

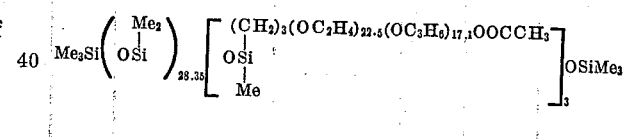

EXAMPLE 6

The products of each of the above examples was employed as a surfactant for the formation of polyurethane foams in the following formulation. There was mixed 50 parts by weight of a polypropyleneglycoltriol of 3,000 molecular weight, .7 part by weight of the surfactant, 1.7 parts by weight water, .28 part by weight dibutyltin dilaurate, and .04 part by weight triethylamine. These ingredients were thoroughly mixed and immediately thereafter 21 parts of toluene diisocyanate was added. The mixture was allowed to foam and in each case an excellent foam which showed no pneumatic tendencies was obtained.

Each of the above surfactants was water dispersible.

EXAMPLE 7

When the following polyalkylene oxides are reacted with the following siloxanes in accordance with the procedure of Example 1, the following copolymers are obtained.

| Polyalkylene oxide | Siloxane | Copolymer |
|---|---|---|
| CH$_2$=CHCH$_2$O(C$_2$H$_4$O)$_{15}$(C$_3$H$_6$O)$_{20}$C$_4$H$_9$ | C$_6$H$_5$Si[(OSi)$_{25}$OSiH$_2$]$_3$ (with Me$_2$ groups) | C$_6$H$_5$Si[(OSi)$_{25}$OSi(CH$_2$)$_3$O(C$_2$H$_4$O)$_{15}$(C$_3$H$_6$O)$_{20}$C$_4$H$_9$]$_3$ |
| CH$_2$=CHCH$_2$O(C$_2$H$_4$O)$_{27}$(C$_3$H$_6$O)$_{21}$OOCC$_2$H$_5$ | C$_{10}$H$_{21}$Si[(OSi)$_{25}$OSiH]$_3$ | C$_{10}$H$_{21}$Si[(OSi)$_{25}$OSi(CH$_2$)$_3$O(C$_2$H$_4$O)$_{27}$(C$_3$H$_6$O)$_{21}$OOCC$_2$H$_5$]$_3$ |
| CH$_2$=CHCH$_2$O(C$_2$H$_4$O)$_{27}$(C$_3$H$_6$O)$_{21}$OCC$_6$H$_5$ | Me$_3$SiO(SiO)$_{25}$(SiO)$_{25}$SiMe$_3$ (with Me$_2$ and H/Me groups) | Me$_3$SiO(SiO)$_{25}$[(CH$_2$)$_3$O(C$_2$H$_4$O)$_{27}$(C$_3$H$_6$O)$_{21}$OCC$_6$H$_5$ / SiO / Me]$_{25}$SiMe$_3$ |
| CH$_2$=CHCH$_2$O(C$_2$H$_4$O)$_{27}$(C$_3$H$_6$O)$_{21}$OCC$_8$H$_{17}$ | HSi[(OSi)$_{25}$OSiH]$_3$ (Me$_2$, Me$_2$ with H/Me) | H$_{17}$C$_8$CO(C$_3$H$_6$O)$_{21}$(OC$_2$H$_4$O)$_{27}$O(CH$_2$)$_3$Si[(OSi)$_{25}$OSi(CH$_2$)$_3$O(C$_2$H$_4$O)$_{27}$(C$_3$H$_6$O)$_{21}$OCC$_8$H$_{17}$]$_2$ |
| CH$_2$=CHCH$_2$O(C$_2$H$_4$O)$_{15}$(C$_3$H$_6$O)$_{21}$CH(CH$_2$OMe)$_2$ | C$_6$H$_{11}$Si[(OSi)$_{25}$OSiH]$_3$ | C$_6$H$_{11}$Si[(OSi)$_{25}$OSi(CH$_2$)$_3$O(C$_2$H$_4$O)$_{15}$(C$_3$H$_6$O)$_{21}$CH(CH$_2$OMe)]$_3$ |
| CH$_2$=CHCH$_2$O(C$_2$H$_4$O)$_{35}$(C$_3$H$_6$O)$_{30}$OCCH$_3$ | Si[(OSiMe$_2$)$_{30}$(OSiMeH)$_5$OSiMe$_3$]$_4$ | Si[(OSiMe$_2$)$_{30}$(OSiMe(CH$_2$)$_3$O(C$_2$H$_4$O)$_{35}$(C$_3$H$_6$O)$_{30}$OCCH$_3$)$_5$OSiMe$_3$]$_4$ |
| CH$_2$=CHCH$_2$O(C$_2$H$_4$O)$_{50}$(C$_3$H$_6$O)$_{40}$OCCH$_3$ | Si[(OSiMe$_2$)$_{125}$(OSiMeH)$_{15}$OSiMe$_3$]$_4$ | Si[(OSiMe$_2$)$_{125}$O[Si(CH$_2$)$_3$O(C$_2$H$_4$O)$_{50}$(C$_3$H$_6$O)$_{40}$OCCH$_3$]$_{15}$Si(CH$_2$)$_3$O(C$_2$H$_4$O)$_{50}$(C$_3$H$_6$O)$_{40}$OCCH$_3$]$_4$ |
| CH$_2$=CHCH$_2$O(C$_2$H$_4$O)$_{27}$(C$_3$H$_6$O)$_{21}$OCCH$_3$ | C$_2$H$_5$Si[(OSiMe$_2$)$_{50}$(OSiMe$_2$H)$_5$OSiMe$_2$H]$_3$ | C$_2$H$_5$Si[(OSiMe$_2$)$_{50}$O[Si(CH$_2$)$_3$O(C$_2$H$_4$O)$_{27}$(C$_3$H$_6$O)$_{21}$OCCH$_3$]$_5$Si(CH$_2$)$_3$O(C$_2$H$_4$O)$_{27}$(C$_3$H$_6$O)$_{21}$OCCH$_3$]$_3$ |
| CH$_2$=CH(CH$_2$)$_{40}$O(C$_2$H$_4$O)$_{40}$(C$_3$H$_6$O)$_{40}$OCCH$_3$ | HMe$_2$Si(OSiMe$_2$)$_{140}$(OSiMeH)$_{10}$OSiMe$_2$H | CH$_3$CO(OC$_2$H$_4$)$_{40}$(OC$_2$H$_4$)$_{40}$Si(CH$_2$)$_{40}$Si(CH$_2$)$_{140}$[OSi(CH$_2$)$_{40}$O(C$_2$H$_4$O)$_{40}$(C$_3$H$_6$O)$_{40}$OCCH$_3$]$_{10}$OSi(CH$_2$)$_{40}$O(C$_2$H$_4$O)$_{40}$(C$_3$H$_6$O)$_{40}$OCCH$_3$ |
| CH$_2$=CHO(C$_2$H$_4$O)$_{60}$(C$_4$H$_9$O)$_{35}$C$_4$H$_9$ | Me$_3$Si(OSiMe$_2$)$_{90}$(OSiMeH)$_9$OSiMe$_3$ | Me$_3$Si(OSiMe$_2$)$_{90}$[OSiCH$_2$CH$_2$O(C$_2$H$_4$O)$_{60}$(C$_4$H$_9$O)$_{35}$C$_4$H$_9$]$_9$OSiMe$_3$ |
| CH$_2$=CHCH$_2$CH$_2$O(C$_2$H$_4$O)$_{15}$(C$_3$H$_6$O)$_{15}$OCCH$_3$ | Me$_3$Si(OSiMe$_2$)$_{25}$(OSiMeH)$_8$OSiMe$_3$ | Me$_3$Si(OSiMe$_2$)$_{25}$[OSi(CH$_2$)$_4$O(C$_2$H$_4$O)$_{15}$(C$_3$H$_6$O)$_{15}$OCCH$_3$]$_8$OSiMe$_3$ |
| CH$_2$=CHC$_{10}$H$_{20}$O(C$_2$H$_4$O)$_{35}$(C$_3$H$_6$O)$_{25}$OCCH$_3$ | Me$_3$Si(OSiMe$_2$)$_{125}$(OSiMeH)$_{15}$OSiMe$_3$ | Me$_3$Si(OSiMe$_2$)$_{125}$[OSiC$_{12}$H$_{24}$O(C$_2$H$_4$O)$_{35}$(C$_3$H$_6$O)$_{25}$OCCH$_3$]$_{15}$OSiMe$_3$ |
| CH$_2$=CHCH$_2$O(C$_2$H$_4$O)$_{15}$(C$_3$H$_6$O)$_{25}$OCCH$_3$ | MeSi[(OSiMe$_2$)$_{75}$(OSiMeH)$_7$OSiMe$_3$]$_3$ | MeSi[(OSiMe$_2$)$_{75}$[OSi(CH$_2$)$_3$O(C$_2$H$_4$O)$_{15}$(C$_3$H$_6$O)$_{25}$OCCH$_3$]$_7$OSiMe$_3$]$_3$ |

EXAMPLE 8

48 g. of Me$_3$Si(OSiMe$_2$)$_{75.8}$(OSiMeH)$_7$OSiMe$_3$ was mixed with 229 g. of

CH$_2$=CHCH$_2$O(C$_2$H$_4$O)$_{26.1}$(C$_3$H$_6$O)$_{25.1}$OCCH$_3$ 59 g. of isopropanol and 59 g. of toluene. The mixture was heated to 80° C. and then 0.5 cc. of a 2% by weight solution of platinum in isopropanol was added, the platinum being in the form of chloroplatinic acid. The reaction was complete after about 15 minutes, the mixture having become a clear light brown color. The product was stripped to 130° C. at 10 mm. of mercury pressure to yield a product having a viscosity of 1013 cs., a specific gravity of 1.036, a refractive index of 1.4485 and the average structural formula Me
|
Me$_3$Si(OSiMe$_2$)$_{75.8}$[OSi(CH$_2$)$_3$O(C$_2$H$_4$O)$_{26.1}$(C$_3$H$_6$O)$_{25.1}$OCCH$_3$]$_7$OSiMe$_3$

EXAMPLE 9

The procedure of Example 8 was repeated except that the reactants employed were

Me$_3$Si(OSiMe$_2$)$_{109.2}$(OSiMeH)$_{10}$OSiMe$_3$ and

CH$_2$=CHCH$_2$O(C$_2$H$_4$O)$_{24.3}$(C$_3$H$_6$O)$_{26.3}$OCCH$_3$ and the product was stripped to 125° C. at 1 mm. of pressure. The product obtained had a viscosity of 1612 cs., a specific gravity of 1.036, a refractive index of 1.4484 and the average structural formula Me
|
Me$_3$Si(OSiMe$_2$)$_{109.2}$[OSi(CH$_2$)$_3$O(C$_2$H$_4$O)$_{24.3}$(C$_3$H$_6$O)$_{26.3}$OCCH$_3$]$_{10}$OSiMe$_3$

EXAMPLE 10

The procedure of Example 8 was repeated except that the siloxane reactant employed was Me$_3$Si(OSiMe$_2$)$_{220.4}$(OSiMeH)$_{20}$OSiMe$_3$ and the product was stripped to 133° C. at 13 mm. of pressure. The product obtained had a viscosity of 2061 cs., a specific gravity of 1.037, a refractive index of 1.4484 and the average structural formula Me
|
Me$_3$Si(OSiMe$_2$)$_{220.4}$[OSi(CH$_2$)$_3$O(C$_2$H$_4$O)$_{26.1}$(C$_3$H$_6$O)$_{25.1}$OCCH$_3$]$_{20}$—OSiMe$_3$

EXAMPLE 11

The procedure of Example 8 was repeated except that the siloxane reactant employed was Me$_3$Si(OSiMe$_2$)$_{324}$(OSiMeH)$_{30}$OSiMe$_3$ 0.6 cc. of the platinum solution was employed, and the product was stripped to 130° at 8 mm. of pressure. The product obtained had a viscosity of 6269 cs., a specific gravity of 1.037, a refractive index of 1.4475 and the average structural formula Me
|
Me$_3$Si(OSiMe$_2$)$_{324}$[OSi(CH$_2$)$_3$O(C$_2$H$_4$O)$_{26.1}$(C$_3$H$_6$O)$_{25.1}$OCCH$_3$]$_{30}$—OSiMe$_3$

EXAMPLE 12

The products of Examples 8–11 were employed as surfactants for the preparation of polyurethane foams from the following formulation. All parts are on a weight basis. 100 parts of a 3500 molecular weight polyether triol, 15 parts of monofluorotrichloromethane, 4 parts of water, 0.15 part of triethylenediamine, 0.30 part of stannous octoate and 1.4 parts of the surfactant were thoroughly mixed and then 48.6 parts of toluene diisocyanate added thereto. The mixture was allowed to foam and in each case an excellent foam having fine open cells was obtained. These foams showed no pneumatic tendencies.

The above foams were also tested for breathability which is a measure of the number of open cells in the foam. "Breathability" is a numerical measure of the amount of air that can be drawn through a 1½″ × 1½″ × 1″ specimen of the foam at a pressure head of 1″ of water. The air is drawn through 1″ thickness of the foam, the air flow being parallel to the direction of foam rise. The breathability or air flow is reported in cubic feet of air per minute. The four foams prepared above using the surfactants of Examples 8–11 had the following breathabilities, respectively, 5.1, 5.4, 4.1 and 3.6 cubic feet of air per minute.

That which is claimed is:
1. A copolymer selected from the group consisting of copolymers having the average structural formulae
   (1) R$_a$Si[(OSiMe$_2$)$_n$(OSiMeG)$_d$OSiMe$_2$G]$_{4-a}$,
   (2) GMe$_2$Si(OSiMe$_2$)$_n$(OSiMeG)$_b$OSiMe$_2$G,
   (3) Me$_3$Si(OSiMe$_2$)$_n$(OSiMeG)$_c$OSiMe$_3$ and
   (4) R$_a$Si[(OSiMe$_2$)$_n$(OSiMeG)$_c$OSiMe$_3$]$_{4-a}$, in which formulae R is a hydrocarbon radical free of aliphatic unsaturation and contains from 1 to 10 carbon atoms, Me is a methyl radical, G is a radical of the structure —D(OR″)$_m$A wherein
   D is an alkylene radical containing from 1 to 30 carbon atoms,
   R″ is composed of ethylene radicals and radicals selected from the group consisting of propylene and butylene radicals, the amount of ethylene radicals relative to the other alkylene radicals being such that the ratio of carbon atoms to oxygen atoms in the total OR″ blocks ranges from 2.3:1 to 2.8:1,
   m has an average value from 25 to 100,
   A is a radical selected from the group consisting of the —OR′, —OOCR′ and $$-\text{O}\overset{\text{O}}{\overset{\|}{\text{C}}}\text{OR}'$$

radicals wherein R′ is a radical free of aliphatic unsaturation selected from the group consisting of hydrocarbon and hydrocarbonoxy radicals, the A radical containing a total of less than eleven atoms, a has an average value of from 0 to 1,
n has an average value of from 6 to 420,
d has an average value of from 0 to 30,
b has an average value from 1 to 30 and
c has an average value from 3 to 30,
said copolymers containing at least 13 percent by weight OSiMe$_2$ units based on the weight of the copolymer.

2. A copolymer having the average structural formula R$_a$Si[(OSiMe$_2$)$_n$(OSiMeG)$_d$OSiMe$_2$G]$_{4-a}$, wherein
R is a hydrocarbon radical free of aliphatic unsaturation and contains from 1 to 10 carbon atoms,
Me is a methyl radical,
G is a radical of the structure —D(OR″)$_m$A wherein
   D is an alkylene radical containing from 1 to 30 carbon atoms,
   R″ is composed of ethylene radicals and radicals selected from the group consisting of propylene and butylene radicals, the amount of ethylene radicals relative to the other alkylene radicals being such that the ratio of carbon atoms to oxygen atoms in the total OR″ blocks ranges from 2.3:1 to 2.8:1,
   m has an average value from 25 to 100,
   A is a radical selected from the group consisting of the —OR′, —OOCR′ and $$-\text{O}\overset{\text{O}}{\overset{\|}{\text{C}}}\text{OR}'$$

radicals wherein R′ is a radical free of aliphatic unsaturation selected from the group consisting of hydrocarbon and hydrocarbonoxy radicals, the A radical containing a total of less than eleven atoms, a has an average value of from 0 to 1, $n$ has an average value of from 6 to 420, and
$d$ has an average value of from 0 to 30.

3. A copolymer as defined in claim 2 wherein $d$ is 0.
4. A copolymer as defined in claim 3 wherein D is a propylene radical and R″ is composed of ethylene and propylene radicals.
5. The copolymer

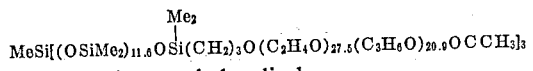

wherein Me is a methyl radical.

6. The copolymer

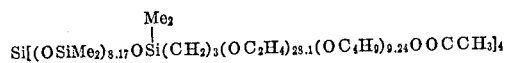

wherein Me is a methyl radical.

7. A copolymer having the average structural formula GMe$_2$Si(OSiMe$_2$)$_n$(OSiMeG)$_b$OSiMe$_2$G, wherein
Me is a methyl radical,
G is a radical of the structure —D(OR″)$_m$A wherein
D is an alkylene radical containing from 1 to 30 carbon atoms,
R″ is composed of ethylene radicals and radicals selected from the group consisting of propylene and butylene radicals, the amount of ethylene radicals relative to the other alkylene radicals being such that the ratio of carbon atoms to oxygen atoms in the total OR″ blocks ranges from 2.3:1 to 2.8:1,
$m$ has an average value from 25 to 100,
A is a radical selected from the group consisting of the —OR′, —OOCR′ and

radicals wherein R′ is a radical free of aliphatic unsaturation selected from the group consisting of hydrocarbon and hydrocarbonoxy radicals, the A radical containing a total of less than eleven atoms,
$n$ has an average value of from 6 to 420, and
$b$ has an average value from 1 to 30.

8. A copolymer as defined in claim 7 wherein D is a propylene radical and R″ is composed of ethylene and propylene radicals.
9. The copolymer

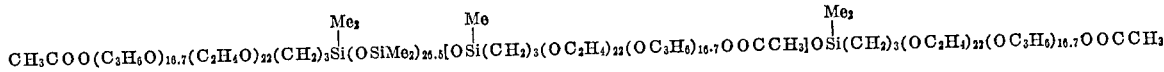

wherein Me is a methyl radical.

10. The copolymer

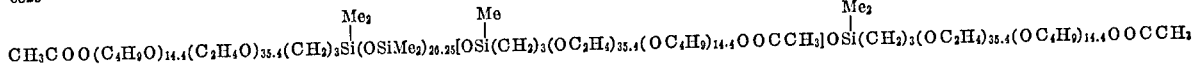

wherein Me is a methyl radical.

11. A copolymer having the average structural formula Me$_3$Si(OSiMe$_2$)$_n$(OSiMeG)$_c$OSiMe$_3$, wherein
Me is a methyl radical,
G is a radical of the structure —D(OR″)$_m$A wherein
D is an alkylene radical containing from 1 to 30 carbon atoms,
R″ is composed of ethylene radicals and radicals selected from the group consisting of propylene and butylene radicals, the amount of ethylene radicals relative to the other alkylene radicals being such that the ratio of carbon atoms to oxygen atoms in the total OR″ blocks ranges from 2.3:1 to 2.8:1,
$m$ has an average value from 25 to 100,
A is a radical selected from the group consisting of the —OR′, —OOCR′ and

radicals wherein R′ is a radical free of aliphatic unsaturation selected from the group consisting of hydrocarbon and hydrocarbonoxy radicals, the A radical containing a total of less than eleven atoms,
$n$ has an average value of from 6 to 420, and
$c$ has an average value from 3 to 30.

12. A copolymer as defined in claim 11 wherein D is a propylene radical and R″ is composed of ethylene and propylene radicals.
13. The copolymer

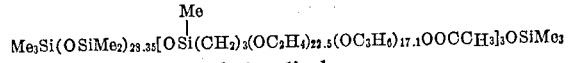

wherein Me is a methyl radical.

14. The copolymer

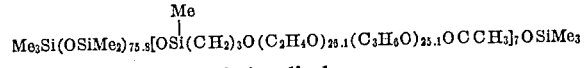

wherein Me is a methyl radical.

15. The copolymer

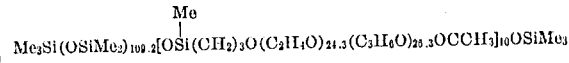

wherein Me is a methyl radical.

16. The copolymer

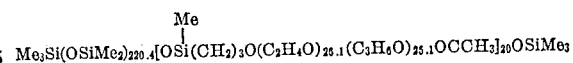

wherein Me is a methyl radical.

17. The copolymer

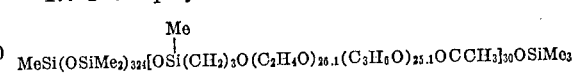

wherein Me is a methyl radical.

18. A copolymer having the average structural formula

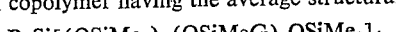

wherein
R is a hydrocarbon radical free of aliphatic unsaturation and contains from 1 to 10 carbon atoms, A is a radical selected from the group consisting of the —OR', —OOCR' and

radicals wherein R' is a radical free of aliphatic unsaturation selected from the group consisting of hydrocarbon and hydrocarbonoxy radicals, the A radical containing a total of less than eleven atoms, $a$ has an average value of from 0 to 1,
$n$ has an average value of from 6 to 420, and
$c$ has an average value from 3 to 30.

References Cited

UNITED STATES PATENTS

| | | | |
|---|---|---|---|
| 2,839,558 | 6/1958 | Kirkpatrick et al. | 260—448.8 |
| 2,846,458 | 8/1958 | Haluska | 260—448.2 |
| 2,834,748 | 5/1958 | Bailey et al. | 260—42 XR |

TOBIAS E. LEVOW, *Primary Examiner.*

J. P. PODGORSKI, *Assistant Examiner.*